No. 754,588. Patented March 15, 1904.

UNITED STATES PATENT OFFICE.

THOMAS MELLOR, OF PHILADELPHIA, PENNSYLVANIA.

COMPOSITION OF MATTER FOR WASHING AND BLEACHING.

SPECIFICATION forming part of Letters Patent No. 754,588, dated March 15, 1904.

Application filed December 1, 1903. Serial No. 183,413. (No specimens.)

*To all whom it may concern:*

Be it known that I, THOMAS MELLOR, a subject of the King of Great Britain, residing at No. 3020 Diamond street, Philadelphia, Pennsylvania, have invented a new and useful Composition of Matter for Washing and Bleaching of Clothing, of which the following is a specification.

The composition consists of the following ingredients combined in the proportions, viz: linseed-oil, six and one-fourth pounds; benzol, six and one-fourth ounces; petroleum, eighteen and three-fourths ounces; turpentine, eighteen and three-fourths ounces; chloroform, twelve and one-half ounces; glycerin, six and one-fourth ounces; alcohol, six and one-fourth pounds; potassium hydrate, twenty-five ounces; carbonate ammonium, twenty-five ounces; gelatin, ten and one-half ounces. The above ingredients to be thoroughly mingled by agitation.

Manner of using the above composition: Dissolve twenty-four ounces of ordinary soap in thirty gallons of boiling water. Then add of the above composition two and one-third ounces, mingle by agitation. Then put in articles to be washed and bleached, allow them to remain thirty minutes. Cover vessel used to retain the heat. Rinse with hot water in the ordinary way.

What I claim, and desire to secure by Letters Patent of the United States, is—

The herein-described composition of matter for washing and bleaching, consisting of linseed-oil, benzol, petroleum, turpentine, chloroform, glycerin, alcohol, potassium hydrate, carbonate ammonium, and gelatin, substantially as described for the purpose specified and in the proportions named.

In testimony whereof I have signed my name to this specification in the presence of two subscribing witnesses.

THOMAS MELLOR.

Witnesses:
 DELL W. NOBLIT,
 ALFRED Z. SMITH.